(12) United States Patent
Gough et al.

(10) Patent No.: US 8,481,640 B2
(45) Date of Patent: Jul. 9, 2013

(54) POLYMER COMPOSITIONS

(75) Inventors: Helen L. Gough, Barry (GB); Iain A. MacKinnon, Penarth (GB); Sarah O'Hare, Nr. Barry (GB); Geraldine Durand, Messas (GB)

(73) Assignee: Dow Corning Corporation, Midland, MI (US)

( * ) Notice: Subject to any disclaimer, the term of this patent is extended or adjusted under 35 U.S.C. 154(b) by 456 days.

(21) Appl. No.: 12/597,788

(22) PCT Filed: Apr. 30, 2008

(86) PCT No.: PCT/EP2008/055372
§ 371 (c)(1),
(2), (4) Date: Jan. 7, 2010

(87) PCT Pub. No.: WO2008/132237
PCT Pub. Date: Nov. 6, 2008

(65) Prior Publication Data
US 2010/0168325 A1 Jul. 1, 2010

(30) Foreign Application Priority Data
May 1, 2007 (GB) .................................. 0708347.0

(51) Int. Cl.
*C08L 83/05* (2006.01)

(52) U.S. Cl.
USPC .......................................... 524/588; 525/478

(58) Field of Classification Search
None
See application file for complete search history.

(56) References Cited

U.S. PATENT DOCUMENTS

| | | | |
|---|---|---|---|
| 3,565,845 A | 2/1971 | Johnson | |
| 3,620,821 A | 11/1971 | Johnson | |
| 3,801,616 A * | 4/1974 | Litteral | 556/446 |
| 3,836,560 A * | 9/1974 | Prokai et al. | 556/446 |
| 3,867,420 A * | 2/1975 | Morehouse et al. | 556/420 |
| 3,957,842 A * | 5/1976 | Prokai et al. | 556/444 |
| 4,546,018 A | 10/1985 | Ryuzo et al. | |
| 4,740,533 A * | 4/1988 | Su et al. | 523/106 |
| 4,824,651 A | 4/1989 | Frey et al. | |
| 4,837,274 A | 6/1989 | Kawakubo et al. | |
| 4,853,474 A | 8/1989 | Bahr et al. | |
| 4,879,142 A | 11/1989 | Fey et al. | |
| 4,906,707 A | 3/1990 | Yukimoto et al. | |
| 4,910,255 A | 3/1990 | Wakabayashi et al. | |
| 5,011,900 A * | 4/1991 | Yukimoto et al. | 525/477 |
| 5,136,068 A * | 8/1992 | Bahr et al. | 516/20 |
| 5,138,009 A * | 8/1992 | Inoue | 528/15 |
| 5,227,410 A * | 7/1993 | Eckberg et al. | 522/75 |
| 5,240,971 A | 8/1993 | Eckberg et al. | |
| 5,312,885 A * | 5/1994 | Takago et al. | 528/15 |
| 5,539,013 A * | 7/1996 | Eckberg et al. | 522/75 |
| 5,767,219 A | 6/1998 | Takarada et al. | |
| 5,811,487 A | 9/1998 | Schulz, Jr. et al. | |
| 5,849,812 A * | 12/1998 | Zech et al. | 523/109 |
| 6,013,711 A | 1/2000 | Lewis et al. | |
| 6,346,583 B1 | 2/2002 | Kilgour et al. | |
| 6,552,104 B1 * | 4/2003 | Hare | 523/109 |
| 6,649,688 B1 | 11/2003 | Mayer et al. | |
| 6,858,218 B2 * | 2/2005 | Lai et al. | 424/422 |
| 6,861,457 B2 * | 3/2005 | Kamohara | 523/109 |
| 7,022,800 B2 | 4/2006 | Tachikawa et al. | |
| 7,456,246 B2 * | 11/2008 | Kamohara et al. | 528/43 |
| 7,662,984 B2 * | 2/2010 | Nakazawa et al. | 556/430 |
| 7,968,645 B2 * | 6/2011 | Zech et al. | 524/588 |
| 8,022,149 B2 | 9/2011 | Ueda et al. | |
| 2008/0312366 A1 * | 12/2008 | Maton et al. | 524/423 |
| 2010/0048795 A1 * | 2/2010 | Kennan et al. | 524/500 |
| 2010/0168309 A1 | 7/2010 | Mackinnon et al. | |
| 2010/0168325 A1 * | 7/2010 | Gough et al. | 524/588 |

FOREIGN PATENT DOCUMENTS

| | | |
|---|---|---|
| DE | 2949725 | 6/1981 |
| DE | 19855125 | 5/2000 |
| DE | 19918361 | 10/2000 |
| EP | 281154 | 9/1988 |
| EP | 281964 | 9/1988 |
| EP | 298402 | 1/1989 |
| EP | 0430476 | 5/1991 |
| EP | 0545660 | 6/1993 |
| EP | 0848029 | 6/1998 |
| EP | 1254192 | 8/2004 |
| JP | 50146645 | 11/1975 |
| JP | 54056655 | 5/1979 |

(Continued)

OTHER PUBLICATIONS

Cretich, Marina et al., Electroosmotic flow suppression in capillary electrophoresis: Chemisorption of trimethoxy silane-modified polydimethylacrylamide, Electrophoresis (2005), 26(10), 1913-1919.

(Continued)

*Primary Examiner* — Robert S Loewe
(74) *Attorney, Agent, or Firm* — Alan Zombeck

(57) ABSTRACT

The invention relates to a water-insoluble hydrophilic polymer network comprising polyorganosiloxane polyoxyalkylene block copolymer moieties characterized that they are linked to each other through an organosilicon cross-linking moiety, provided that the cross-linking moiety forming the links between polyorganosiloxane polyoxyalkylene block copolymer moieties result from an addition reaction between cross-linking sites present on the polyorganosiloxane polyoxyalkylene block copolymer moieties prior to formation of the hydrophilic polymer network, selected from silicon-bonded hydrogen atoms and aliphatically unsaturated groups, and reactive groups present on the cross-linking moiety prior to formation of the hydrophilic polymer network. Also disclosed is a process for making the polymer network, and a curable composition able to be reacted into such polymer network.

6 Claims, No Drawings

FOREIGN PATENT DOCUMENTS

| | | |
|---|---|---|
| JP | 60223860 | 11/1985 |
| JP | 61031416 | 2/1986 |
| JP | 61040352 | 2/1986 |
| JP | 61053376 | 3/1986 |
| JP | 61076345 | 4/1986 |
| JP | 61188406 | 8/1986 |
| JP | 62112647 | 5/1987 |
| JP | 1006042 | 1/1989 |
| JP | 7094310 | 4/1995 |
| JP | 11021354 | 1/1999 |
| JP | 2001106781 | 4/2001 |
| JP | 2007238820 | 9/2007 |
| WO | WO0149774 | 7/2001 |
| WO | 2004096887 | 11/2004 |

OTHER PUBLICATIONS

Darensbourg, Donald J., et al., The copolymerization of carbon dioxide and {2-(3,4- epoxycyclohexyl)ethyl} trimethoxy silane catalyzed by (Salen)CrCl. Formation of a CO2 soluble, Inorganic Chemistry (2003), 42(15), 4498-4500polycarbonate.

Sun, Y. H. et al., Synthesis and characterization of non-fouling polymer surfaces: I. Radiation grafting of hydroxyethyl methacrylate and polyethylene glycol methacrylate onto Silastic J., Bioact. Compat. Polym., 1(3), 316-34.

Vitry, Solweig, et al., Hybrid copolymer latexes crosslinked with methacryloxy propyl trimethoxy silane, film formation and mechanical properties, Comptes Rendus Chimie (2003), 6(11-12), 1285-1293.

Abstract: JP50128767, Glass fiber reinforced epoxy resin laminate—using e.g. (gamma)-glcidoxypropyl-trimethoxy-silane and polyvinyl alcohol binders, Shin-Kobe Elec KK, Oct. 11, 1975.

* cited by examiner

POLYMER COMPOSITIONS

CROSS REFERENCE TO RELATED APPLICATIONS

This application is a U.S. national stage filing under 35 U.S.C. §371 of PCT Application No. PCT/EP2008/055372 filed on Mar. 30, 2008, currently pending, which claims the benefit of Patent Application No. GB 0708347.0 filed 1 May 2007 under 35 U.S.C. §119 (a)-(d) and 35 U.S.C. §365(a). PCT Application No. PCT/EP2008/055372 and Patent Application No. GB 0708347.0 are hereby incorporated by reference.

This invention relates to a water-insoluble hydrophilic polymer network having unusual surface properties, to a method of preparing such a hydrophilic polymer network and to a polymer composition curable to such a water-insoluble hydrophilic polymer network.

Polyorganosiloxane compositions generally have a low surface energy and are hydrophobic. For some uses of polyorganosiloxane compositions, a hydrophilic polymer is required to give improved wetting of a polymer surface by an aqueous liquid contacting the surface, while retaining some of the advantageous properties of the polyorganosiloxane.

U.S. Pat. No. 5,240,971 and EP545660 patent application describe silicone polyether linear block copolymers containing at least two Si—H groups. The Si—H groups are reacted with an epoxy-functional olefin to obtain an epoxy-silicone polyether that can be cured by UV radiation.

U.S. Pat. No. 6,346,583 describes a cross-linked hydrosilylation reaction product of an alkenyl functional silicone compound, a silylhydride functional silicone compound and one or more allyl started, hydrogen, alkyl, aryl or acyl terminated polyether compounds, which exhibit stability, compatibility with polar solvents and is useful as a component in personal care compositions.

EP 298402 A3 describes a cross-linked organopolysiloxane, which is an organopolysiloxane-polyoxyalkylene emulsifier for polar in non-polar liquid emulsions wherein organopolysiloxane-polyoxyalkylene copolymer molecules are intentionally cross-linked through a cross-linking agent joined thereto by non-hydrolysable bonds and being free of internal hydrolysable bonds.

U.S. Pat. No. 6,013,711 relates to a method of improving the miscibility of a lower molecular weight unsaturated siloxane-polyether copolymer with α-ω-divinylpolysiloxanes without loss of storage stability or delay of cure at the vulcanisation temperature, or loss of permanent hydrophilicity or other desirable features of the cured polysiloxane. The compositions comprise one or more α-ω-divinylpolysiloxanes, unsaturated polysiloxane-polyether copolymers having from 2 to 5 silicon atoms per molecule and a compatibalising additive.

DE 19918361 describes liquid polyether-polysiloxane copolymers with branches and cross-links which comprise silicon-carbon bonds.

In all but the first of these prior art documents, the polyether moiety of the composition is a pending moiety in the siloxane chain. Where the polyether is reacted into the chain itself, i.e. in U.S. Pat. No. 5,240,971 and EP545660, the prior art indicates the use of these materials by also incorporating epoxy functionality to enable UV-cure onto a substrate, for example in paper or liner coating for release purposes, in conformal coating or electronic encapsulation.

It has now been surprisingly found by the inventors that the use of polyorganosiloxane polyoxyalkylene block copolymers, where the polyoxyalkylene is reacted into the backbone of the copolymer, is particularly useful for the reaction into polymer networks via addition reaction, which networks exhibit hydrophilic properties.

A water-insoluble hydrophilic polymer network according to the present invention comprises accordingly polyorganosiloxane polyoxyalkylene block copolymer moieties linked to each other through an organosilicon cross-linking moiety, provided that the cross-linking moiety forming the links between polyorganosiloxane polyoxyalkylene block copolymer moieties result from an addition reaction between cross-linking sites present on the polyorganosiloxane polyoxyalkylene block copolymer moieties prior to formation of the hydrophilic polymer network, selected from silicon-bonded hydrogen atoms and aliphatically unsaturated groups, and reactive groups present on the cross-linking moiety prior to formation of the hydrophilic polymer network able to react with the cross-linking sites on the block copolymer.

A process according to another aspect of the invention for preparing such a water-insoluble hydrophilic polymer network comprises reacting a polyorganosiloxane polyoxyalkylene block copolymer having at least two reactive groups X, selected from silicon-bonded hydrogen atoms and aliphatically unsaturated groups, with a substantially Si—O—C free organosilicon cross-linking agent having at least two groups Y reactive with the groups X via addition reaction, provided that if the polyorganosiloxane polyoxyalkylene block copolymer has only two reactive groups X per molecule the cross-linking agent has on average more than two reactive groups Y per molecule.

The polyorganosiloxane polyoxyalkylene block copolymer generally comprises at least one polyorganosiloxane block and at least one polyoxyalkylene block. One preferred type of polyorganosiloxane polyoxyalkylene block copolymer has the form $PS-(A-PO)_m-(A-PS)_n$ wherein each PS represents a polyorganosiloxane block, PO represents a polyoxyalkylene block, A represents a divalent radical and m and n have a value of at least 1. It is preferred that a PS block forms the terminal group of the block copolymer on both ends of the block copolymer. More preferred are the block copolymers $PS-(A-PO-A-PS)_n$. The cross-linkable reactive group X, where they are silicon-bonded hydrogen atoms are most preferably each situated on a terminal silicon atom of the polyorganosiloxane polyoxyalkylene block copolymer, although this is not essential. The cross-linkable reactive silicon-bonded hydrogen atoms may however be situated on any polyorganosiloxane block of the block copolymer.

Alternatively the polyorganosiloxane polyoxyalkylene block copolymer has the form $PO-(A-PS)_m-(A-PO)_n$ or $PO-(A-PS-A-PO)_n$ wherein PO, PS and A are as defined above. These block copolymers will have a group X which is located at the PO moiety, preferably at the terminal position of the PO moiety and would preferably constitute an aliphatically, e.g. olefinically or acetylenically unsaturated group, preferably an ethylenically unsaturated group. These block copolymers are however less preferred for use in the hydrophilic polymer networks according to the invention.

The PS blocks will comprise siloxane units of the general formula $$R_rSiO_{(4-r/2)}$$

wherein R represents hydrogen, alkyl, aryl, alkaryl or aralkyl preferably having from 1 to 18 carbon atoms. Particularly preferred alternatives to hydrogen are alkyl groups having from 1 to 6 carbon atoms and phenyl groups, although more preferred such R denotes an alkyl group having from 1 to 3 carbon atoms, most preferably methyl. It is preferred that only up to 4 R groups in the block copolymer denote hydrogen, more preferably only 2, and these being most preferably present on the terminal silicon atoms of the block copolymer, which means that for the preferred block copolymers only the terminal PS blocks would have one silicon-bonded hydrogen present each. It will be clear to the person skilled in the art that, where the block copolymers are of the type where the PO blocks are terminal, none of the R groups in the PS block would be hydrogen. The value of r is preferably on average between 1.6 and 2.4, most preferably 1.9 to 2.1. However siloxane units where r has a value of 3 will be present as terminal groups, which is particularly desirable for the siloxane units on which a silicon-bonded hydrogen is located. In addition some siloxane units with a value for r of 0 or 1 may also be present, but these are preferably kept to a minimum, such as no more than 2% of the total siloxane units in the PS block, as they introduce branching into the PS block.

Most preferred therefore are PS blocks which are polydimethylsiloxane moieties which may be end-blocked by hydrogen-dimethyl siloxane units on one side and which may be linked to the divalent linking group A on the other side. Where m and/or n has a value greater than 1, the more central PS block(s) will be linked to an A group on both sides. The number of siloxane units in the PS block is not crucial, and will be selected in view of the desired properties of the block copolymer or the hydrophilic polymer network resulting from it. Preferably the PS group will have from 2 to 200 siloxane units, more preferably from 4 to 40, most preferably from 10 to 30.

The PO group is a polyoxylalkylene group having the general formula

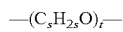

Where each s independently has a value of from 2 to 6, preferably 2 to 3, and t has a value of from 1 to 100, preferably 4 to 40, more preferably 3 to 10. Where the less preferred block copolymers are used, i.e. those where the PO blocks are terminal, the above general formula would be

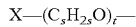

where X denotes the reactive group, which in this case would be an aliphatically unsaturated group, preferably an ethylenically unsaturated group, which would be terminal to the block copolymer. Examples of the polyoxyalkylene blocks include polyoxyethylene groups, polyoxypropylene groups, polyoxyethylene-oxypropylene groups, polyoxyisopropylene groups and groups containing a mixture of the different type of alkylene units as the most preferred. At least 50% of the polyoxyalkylene units in the polyoxyalkylene block are preferably oxyethylene units to give the required hydrophilic properties.

The relative amounts of PS and PO blocks is not limited, but may be adapted to the particular end-use which is envisaged. Where a more hydrophilic nature is desired, a larger proportion by weight of the PO blocks, especially those containing polyoxyethylene units, will be selected as a proportion to the total weight of the block copolymer used in the making of the hydrophilic polymer network. Where hydrophilicity is not needed to the same extent, the proportion by weight of the PO blocks may be smaller, although the composition of the PO block may vary instead, e.g. by providing less polyoxyethylene units therein. The molar ratio of oxyalkylene, for example oxyethylene units to siloxane units in the polyorganosiloxane polyoxyalkylene block copolymer is preferably in the range 0.05:1 to 0.5:1

The group A is a divalent radical, linking the PS and PO blocks together. In their simplest form they may be a divalent alkylene groups, for example being $C_sH_{2s}$, where s is as defined above, for example dimethylene, propylene, isopropylene, isobutylene or hexylene but they may also be other suitable linking groups between PS and PO blocks. These include for example divalent polyorganosiloxane groups terminated by diorganosilylalkylene groups, for example —$C_sH_{2s}$—[Si(R'$_2$)O]$_x$Si(R'$_2$)$C_sH_{2s}$—, wherein R' is as defined above for R except for the hydrogen option, and s and t are as defined above. A person skilled in the art will recognise that this is a non-limiting example of the group A. The group A is generally defined by the process used to link PO and PS groups together, as will be explained in more detail below. It is preferred that the divalent radicals A are substantially free of Si—O—C linkages.

A polyorganosiloxane polyoxyalkylene block copolymer of the form PS-(A-PO)$_m$-(A-PS)$_n$ may be prepared in a hydrosilylation reaction by reacting a polyorganosiloxane having two Si—H groups (i.e. a PS precursor) with a polyether containing two aliphatically, preferably olefinically, more preferably ethylenically unsaturated groups (i.e. a PO precursor), optionally in the presence of a polyorganosiloxane having two aliphatically, preferably olefinically, more preferably ethylenically unsaturated groups, in an amount such that the Si—H groups are present in molar or number excess, at least to some extent, over the aliphatically unsaturated groups when the preferred block copolymers are being made. By aliphatically unsaturated group, we include olefinically and acetylenically unsaturated groups, and in particular ethylenically unsaturated groups, which comprise a moiety which preferably has the formula >CH=CH$_2$, for example a vinyl or allyl group. Alternatively, but less preferred is the use of an unsaturated group which is selected from an olefinically unsaturated group with the unsaturation being between non-terminal carbon atoms, or the use of an acetylenically unsaturated group, such as an alkynyl group, for example ethynyl or propynyl.

The reaction is generally carried out in the presence of a hydrosilylation catalyst such as a platinum group metal or a complex or compound thereof, for example platinum, rhodium and complexes or compounds thereof. The divalent radicals A resulting from such preferred hydrosilylation reaction are alkylene radicals, having for example 2 to 6 carbon atoms depending on the aliphatically unsaturated group of the polyether used, or a α,ω-alkylene-endblocked polydiorganosiloxane, depending on the polyorganosiloxane having aliphatically unsaturated groups which was used.

Where a polyorganosiloxane polyoxyalkylene block copolymer of the form PS-(A-PO-A-PS)$_n$ is to be prepared, the process described above can be used, and the α,ω-alkylene-endblocked polydiorganosiloxane may be left out. If it is not left out, the chance of random distribution of A groups linking PS to PO and PS to PS cannot be easily controlled. However, polymers made according to either formula PS-(A-PO)$_m$-(A-PS)$_n$ or PS-(A-PO-A-PS)$_n$ will be eminently suitable for the hydrophilic polymer networks according to this invention.

The polyorganosiloxane which is reacted with the polyether to form the block copolymer may be branched but is preferably a linear polydiorganosiloxane with a degree of polymerisation (DP) of from 2 to 250 siloxane units, more preferably 2 to 200, even more preferably 4 to 40 siloxane units and most preferably 10 to 30 siloxane units. The organic groups of the polyorganosiloxane are preferably selected from alkyl groups having 1 to 18, preferably 1 to 6, carbon atoms, and phenyl groups. Most preferably at least 90% of the organic groups attached to Si are methyl groups; for example the polyorganosiloxane is a Si—H functional polydimethylsiloxane. The polyorganosiloxane can contain more than two Si—H groups but this is likely to lead to a branched polyorganosiloxane polyoxyalkylene block copolymer. Most preferably the polyorganosiloxane has only two Si—H groups, one at each end of the polydiorganosiloxane chain, so that reaction with the polyether produces a polyorganosiloxane-terminated block copolymer with reactive Si—H groups situated on the terminal silicon atoms of the polyorganosiloxane blocks of the block copolymer, as shown in the reaction scheme below, where m is as defined above and p has a value of at least 1.

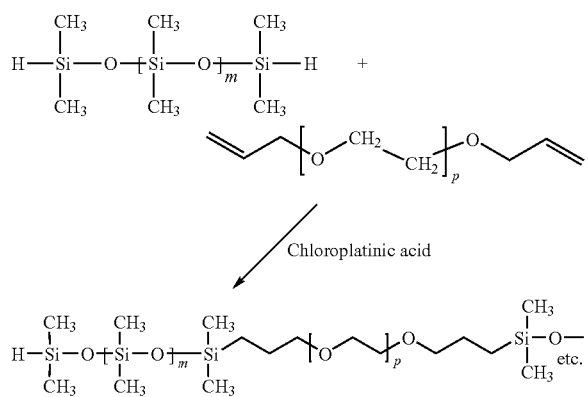

SiH terminated polyorganosiloxane polyoxyalkylene block copolymer Polyorganosiloxanes having Si—H groups on non-terminal siloxane units, or on both terminal and non-terminal siloxane units, can alternatively be used.

The polyoxyalkylene is preferably a polyethylene oxide, although a poly(oxyethylene oxypropylene) copolymer having a majority of polyoxyethylene units may be used. The preferred ethylenically unsaturated groups of the polyether can for example be allyl, vinyl, methallyl, hexenyl or isobutenyl groups. One example of a preferred polyether is polyethylene glycol diallyl ether. The polyethylene oxide preferably has a D.P. of from 4 to 100, more preferably 4 to 40 oxyethylene units.

For the making of the more preferred block copolymers, the Si—H functional polyorganosiloxane and the polyether containing ethylenically or acetylenically unsaturated groups are preferably reacted at a molar ratio of Si—H groups to aliphatically, most preferably ethylenically unsaturated groups in the range 1.5:1 to 6:1, more preferably 2:1 to 4:1. The reaction can be carried out at ambient temperature but an elevated temperature in the range 60 to 200° C., for example 100 to 150° C., may be preferred. The reaction is generally carried out in the presence of a catalyst comprising a platinum group metal such as platinum or rhodium. One preferred platinum catalyst is hexachloroplatinic acid or a reaction product of chloroplatinic acid and an organosilicon compound containing terminal aliphatic unsaturation; another is a platinum divinyl tetramethyl disiloxane complex. The catalyst is preferably used in amounts from 0.00001-0.5 parts platinum or rhodium per 100 weight parts of the SiH-functional polyorganosiloxane, most preferably 0.00001-0.002 parts.

Si—H functional polyorganosiloxane and the polyether containing aliphatically unsaturated groups can alternatively be reacted using a molar excess of the polyether containing the unsaturated groups, for example at a molar ratio of Si—H groups to unsaturated groups in the range 1:1.5 to 1:6, thereby producing a block copolymer of the form PO-(A-PS-A-PO)$_n$ in which PO, PS and A are defined as above and the PO blocks have terminal aliphatically, preferably ethylenically unsaturated groups.

Hydrophilic polymer networks according to the invention are prepared by reacting the polyorganosiloxane polyoxyalkylene block copolymer produced as described above with an organosilicon cross-linking agent having at least two groups Y reactive with the groups X of the polyorganosiloxane polyoxyalkylene block copolymer. Both groups X and Y are selected from silicon-bonded hydrogen atoms on silicon atoms of the polyorganosiloxane polyoxyalkylene block copolymer moieties or aliphatically such as acetylenically or olefinically unsaturated groups, preferably ethylenically unsaturated groups, one being X and the other being the corresponding Y to react therewith via addition reaction. In other words, where X is silicon-bonded hydrogen, Y will be an aliphatically unsaturated group and vice versa.

If the polyorganosiloxane polyoxyalkylene block copolymer has only two reactive groups X per molecule, the cross-linking agent generally has on average more than two reactive groups Y per molecule, for example 2.5 to 6 reactive groups per molecule, to aid network formation (cross-linking) rather than only chain extension. For example, if the organosilicon cross-linking agent is a branched polyorganosiloxane containing at least three reactive groups Y, it can become bonded to at least 3 polymer chains.

If the reactive groups X are Si—H groups, as in the more preferred block copolymers, the organosilicon cross-linking agent can contain aliphatically unsaturated groups Y. It is preferred in such case that the unsaturated groups are as described for the unsaturated groups of the PO precursors, i.e. olefinically, more preferred ethylenically unsaturated groups. Such an organosilicon cross-linking agent is preferably a polysiloxane. The polysiloxane can for example consist of siloxane units selected from tetrafunctional or Q units of the formula (SiO$_{4/2}$), trifunctional or T units of the formula R$^c$SiO$_{3/2}$, difunctional or D units of the formula R$^b_2$SiO$_{2/2}$ and monofunctional or M units of the formula R$^a_3$SiO$_{1/2}$, wherein the R$^a$, R$^b$ and R$^c$ substituents are selected from alkyl and alkenyl groups having 1 to 6 carbon atoms, at least three of R$^a$, R$^b$ and/or R$^c$ substituents per cross-linking agent molecule being alkenyl units.

If the polyorganosiloxane polyoxyalkylene block copolymer is a block copolymer of the form PS-(A-PO-A-PS)$_n$ in which the reactive Si—H groups X are situated on the terminal silicon atoms of the polyorganosiloxane blocks, one suitable type of cross-linking agent is a branched polyorganosiloxane having ethylenically unsaturated groups Y situated on at least 3 branches. Such a branched polyorganosiloxane generally comprises Q and/or T units, M units and optionally D units. The alkenyl groups are preferably present in M units, which are located in terminal positions on the polyorganosiloxane branches. This would result in the preferred situation where the organosilicon cross-linking moiety is a branched polyorganosiloxane bonded to at least three polysiloxane polyoxyalkylene block copolymer moieties in the hydrophilic polymer network.

The polyorganosiloxane can for example be a branched siloxane comprising one or more Q units of the formula (SiO$_{4/2}$), from 0 to 250 D units of the formula R$^b_2$SiO$_{2/2}$ and M units of the formula R$^a$R$^b_2$SiO$_{1/2}$, wherein the R$^a$ and R$^b$ substituents are selected from alkyl and alkenyl groups having 1 to 6 carbon atoms, at least three R$^a$ substituents in the branched siloxane being alkenyl units. If the polyorganosiloxane polyoxyalkylene block copolymer is of relatively high chain length, a low molecular weight Q-branched siloxane cross-linking agent may be preferred, for example a vinyl-functional O-branched siloxane comprising a Q unit, four dimethylvinylsilyl M units and 0 to 20 dimethylsiloxane D units, which may have the formula.

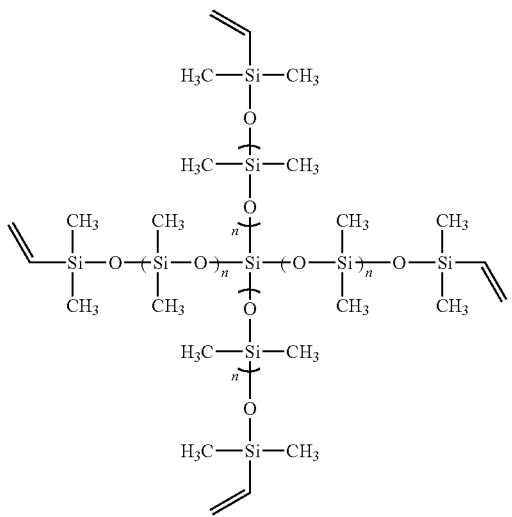

If the polyorganosiloxane polyoxyalkylene block copolymer contains more than two Si—H groups, for example a rake copolymer containing 3 or more Si—H groups, the organosilicon cross-linking agent need not contain more than 2 unsaturated groups. For example the cross-linking agent can be a polydiorganosiloxane containing 2 ethylenically unsaturated groups such as a dimethylvinylsilyl-terminated polydimethylsiloxane, or can be a mixture of such a polydiorganosiloxane containing 2 ethylenically unsaturated groups with a branched polyorganosiloxane having ethylenically unsaturated groups Y situated on at least 3 branches.

The less preferred polyorganosiloxane polyoxyalkylene block copolymer having terminal PO blocks with aliphatically unsaturated end-groups X may be reacted into a hydrophilic polymer network according to the invention by using a organosilicon cross-linking agent as described above where the unsaturated group is replaced with a SiH group Y. The explanations provided above will be applicable vice-versa to these groups X and Y as they have explained for Y and X, and the person skilled in the art will have no issue in applying this teaching accordingly.

If the polyorganosiloxane polyoxyalkylene block copolymer contains reactive groups X which are Si—H groups or aliphatically unsaturated groups, then the organosilicon cross-linking agent can contain aliphatically unsaturated groups Y or Si—H groups respectively. They are generally reacted in the presence of a catalyst comprising a platinum group metal such as platinum or rhodium. Preferred platinum catalysts are as described above. The catalyst is preferably used in amounts from 0.00001-0.5 parts platinum or rhodium per 100 weight parts of the SiH-functional polyorganosiloxane polyoxyalkylene block copolymer. The polyorganosiloxane polyoxyalkylene block copolymer containing Si—H groups and the organosilicon cross-linking agent are preferably reacted at a molar ratio of Si—H groups to aliphatically, preferably ethylenically unsaturated groups in the range 1.5:1 to 6:1, more preferably 2:1 to 4:1. The cross-linking reaction can be carried out at ambient temperature but proceeds faster at an elevated temperature in the range 60 to 200° C.

In another aspect, a polymer composition curable to a water-insoluble hydrophilic polymer network is provided, said composition comprising a polyorganosiloxane polyoxyalkylene block copolymer having at least two reactive groups X as defined above, an organosilicon cross-linking agent, which is substantially free of Si—O—C bonds and has at least two groups Y reactive with the said groups X via addition reaction, provided that if the polyorganosiloxane polyoxyalkylene block copolymer has only two reactive groups X per molecule an organosilicon cross-linking agent having on average more than two reactive groups Y per molecule is present. The information provided above for the block copolymer and the cross-linking agent and for any additional optional ingredients, such as catalysts, organopolysiloxanes and fillers are also applicable to the curable composition according to this aspect of the invention.

Because the cross-linking reaction proceeds at ambient temperature when the polyorganosiloxane polyoxyalkylene block copolymer containing Si—H groups, the cross-linking agent containing aliphatically unsaturated groups and the catalyst are all in contact, it may be preferred to package a curable composition based on such reactive groups in two containers, so that the polyorganosiloxane polyoxyalkylene block copolymer, the cross-linking agent and the catalyst are not all together in the same package. If the curable composition is to be applied at a specific site, for example if it is to be applied to a surface as a coating, the contents of the two parts/packages can be mixed shortly before application. For example the catalyst can be packaged with the cross-linking agent containing aliphatically unsaturated groups, the polyorganosiloxane polyoxyalkylene block copolymer containing Si—H groups being in a separate container. Alternatively the polyorganosiloxane polyoxyalkylene block copolymer and the cross-linking agent can be packaged together, and the catalyst can be packed separately, optionally with part of the polyorganosiloxane polyoxyalkylene block copolymer component or part of the cross-linking agent component.

Optionally in addition to the cure catalyst being a hydrosilylation catalyst, particularly a platinum based catalyst, a suitable hydrosilylation catalyst inhibitor may be required. Any suitable platinum group type inhibitor may be used. One useful type of platinum catalyst inhibitor is described in U.S. Pat. No. 3,445,420, which is hereby incorporated by reference to show certain acetylenic inhibitors and their use. A preferred class of acetylenic inhibitors are the acetylenic alcohols, especially 2-methyl-3-butyn-2-ol and/or 1-ethynyl-2-cyclohexanol which suppress the activity of a platinum-based catalyst at 25° C. A second type of platinum catalyst inhibitor is described in U.S. Pat. No. 3,989,667, which is hereby incorporated by reference to show certain olefinic siloxanes, their preparation and their use as platinum catalyst inhibitors. A third type of platinum catalyst inhibitor includes polymethylvinylcyclosiloxanes having three to six methylvinylsiloxane units per molecule.

The polyorganosiloxane polyoxyalkylene block copolymer can be mixed with a polyorganosiloxane containing no polyoxyalkylene moieties but having the same reactive groups X, for example Si—H groups. This polyorganosiloxane can for example be a polydiorganosiloxane such as polydimethylsiloxane which is terminated with the reactive groups X. When the cross-linking agent is simultaneously reacted with the polyorganosiloxane polyoxyalkylene block copolymer and the polyorganosiloxane having the same reactive groups X, the polyorganosiloxane is reacted into the water-insoluble hydrophilic polymer network. The proportion by weight of polyorganosiloxane polyoxyalkylene block copolymer to the polyorganosiloxane having the same reactive groups X can be any value in the range 100:0 to 10:90.

The hydrophilic polymer network according to the invention is made from a curable compositions as identified above, which can be unfilled or can contain a reinforcing or non-reinforcing filler. Examples of suitable reinforcing fillers include silica, including fumed silica, fused silica, precipitated silica, barium sulphate, calcium sulphate. Calcium carbonate, silicates (such as talc, feldspar and china clay), bentonite and other clays and solid silicone resins, which are generally condensed branched polysiloxanes, such as a silicone resin comprising Q units of the formula ($SiO_{4/2}$) and M units of the formula $R'''_3SiO_{1/2}$, wherein the $R'''$ substituents are selected from alkyl groups having 1 to 6 carbon atoms and the ratio of M units to Q units is in the range 0.4:1 to 1:1.

The hydrophilic polymer networks according to the invention are substantially water-insoluble and have unusual hydrophilic properties. The surface of the cured hydrophilic polymer network is somewhat hydrophobic in the dry state, but becomes hydrophilic when the surface is wetted with water or an aqueous liquid. This effect is reversible. When the wetted surface is allowed to dry, it regains its hydrophobic properties, and can be made hydrophilic again by rewetting. Hydrophilic polymer networks with such properties are produced particularly if the sum of the D.P of the polysiloxane blocks and the D.P. of the polyethylene oxide blocks in the block copolymer are each in the range 15 to 35.

This reversible hydrophilicity can be observed by applying droplets of water to the surface and observing the droplets over time. When the droplet is first applied to the surface, it remains as a droplet on the surface and the contact angle of the water on the surface can be measured. This contact angle is typically in the range 60° to 120° when measured 2 seconds after application of the droplet to the surface and is usually still above 60° 30 seconds after application, but the water droplet spreads over time and the contact angle has generally decreased by at least 10° after 3 minutes and continues to decrease; the contact angle is generally below 60° and may be below 30° 10 minutes after application of the droplet indicating a hydrophilic surface. The change from a hydrophobic surface to a more hydrophilic surface is still observed when part of the polyorganosiloxane polyoxyalkylene block copolymer in the hydrophilic polymer network is replaced by a polydiorganosiloxane, although the extent of change, as measured by decrease in contact angle with water, is reduced as the proportion of polyorganosiloxane polyoxyalkylene block copolymer in the hydrophilic polymer network is reduced. When the surface is then dried and a water droplet is applied to the dried surface, the contact angle measured 2 seconds after application of the droplet to the surface is substantially the same as the contact angle measured after the first application of the water droplet, and the contact angle decreases over time at substantially the same rate as after the first application.

The hydrophilic polymer networks of the invention can be used in various applications in which a polymer surface has to be in contact with water or an aqueous liquid and hydrophilic properties are required. The polymer composition can be applied to a surface as a coating or sealant and cured in situ on the surface to a water-insoluble hydrophilic polymer network. Alternatively the hydrophilic polymer network can be shaped, for example by extrusion of the curable composition and then curing to form the hydrophilic polymer network. A polymer composition curing by a hydrosilylation reaction can for example be shaped and then heat cured.

The invention is illustrated by the following Examples in which all parts and percentages are given by weight, unless otherwise indicated.

EXAMPLE 1

37.5 g of the polyethylene glycol diallyl ether of average D.P. 10 oxyethylene units was placed in 31.20 g toluene in a 3 necked flask and heated to 65° C. under nitrogen followed by 165 μl chloroplatinic acid catalyst. Then 100 g dimethylhydrogensilyl terminated polydimethylsiloxane fluid of average D.P. 6.7 was added dropwise. The molar ratio of SiH groups to allyl groups was 3:1. The mixture was heated for 1 hour at 80° C. then cooled to form a solution of a SiH terminated polysiloxane polyoxyethylene block copolymer of SiH content 4.55%.

The polymer solution produced above was mixed with 2% by weight of a platinum vinyl siloxane complex dissolved in a vinyl siloxane copolymer at 0.5% platinum and with a vinyl-terminated Q-branched polysiloxane of the formula

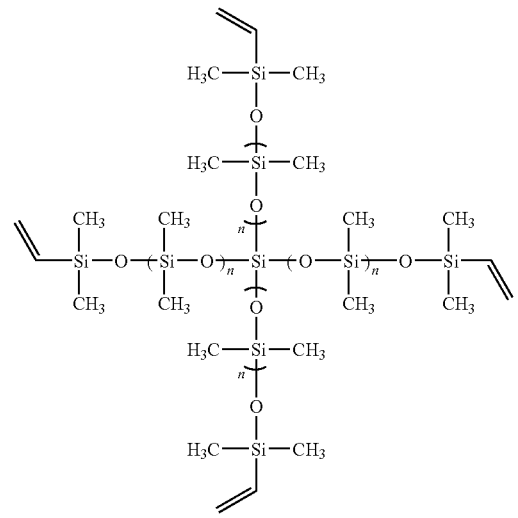

having a total of 100 siloxane D units (i.e. the cumulative total of n per molecule=100) to give a molar ratio of Si—H groups of the SiH terminated polysiloxane polyoxyethylene block copolymer to vinyl groups of 1.4:1. The mixture was applied to a test plate surface and was left for 1 hour at ambient temperature. The composition cured to a water-insoluble hydrophilic polymer network.

EXAMPLE 2

Example 1 was repeated replacing the Q-branched crosslinking agent by a Q-branched polysiloxane of the same general formula but containing a total of 225 siloxane D units, maintaining the SiH to vinyl molar ratio at 1.4:1. A water-insoluble hydrophilic polymer network was produced; this was softer than the cured composition of Example 1.

EXAMPLE 3

Example 1 was repeated replacing the Q-branched crosslinking agent by a Q-branched polysiloxane of the same general formula but containing a total of 4 siloxane D units, maintaining the SiH to vinyl molar ratio at 1.4:1. A water-insoluble hydrophilic polymer network was produced; this was harder and more brittle than the cured composition of Example 1.

EXAMPLES 4 AND 5

The SiH terminated polysiloxane polyoxyethylene block copolymer produced in Example 1 was mixed with an equal weight of a SiH terminated polydimethylsiloxane of substantially the same SiH content. This mixture was mixed with 2% by weight of a platinum vinyl siloxane complex dissolved in a vinyl siloxane copolymer at 0.5% platinum and with a vinyl-terminated Q-branched polysiloxane to give a SiH to vinyl ratio of 1.4:1. The Q-branched polysiloxane contained 100 siloxane D units (Example 4) or 225 siloxane D units (Example 5). The resulting compositions were applied to a test surface and cured as described in Example 1. Water-insoluble hydrophilic polymer networks were produced.

EXAMPLES 6 TO 8

The SiH terminated polysiloxane polyoxyethylene block copolymer produced in Example 1 was mixed with a SiH terminated polydimethylsiloxane of substantially the same SiH content in weight ratio 50:50 (Example 6), 30:70 (Example 7) and 10:90 (Example 8). Each of these mixtures was mixed with 2% by weight of a platinum vinyl siloxane complex dissolved in a vinyl siloxane copolymer at 0.5% platinum and with the vinyl-terminated Q-branched polysiloxane of Example 3 to give a SiH to vinyl ratio of 1.4:1. The resulting compositions were applied to a test surface and cured as described in Example 1. Water-insoluble hydrophilic polymer networks were produced.

The contact angle of water on each of the cured hydrophilic polymer networks of Examples 3 and 6 to 8 was measured over time. A 1 µl water droplet was applied to each surface and the contact angle was measured after 30 seconds and 1, 2 and 3 minutes. The results are shown in Table 1.

TABLE 1

| Example | Contact angle after 30 sec | Contact angle after 60 sec | Contact angle after 120 sec | Contact angle after 180 sec |
|---|---|---|---|---|
| 3 | 76° | 68° | 63° | 55° |
| 6 | 75° | 72° | 68° | 61° |
| 7 | 90° | 84° | 72° | 70° |
| 8 | 93° | 89° | 83° | 74° |

As can be seen from Table 1, the contact angle of water on the cured polymers of Examples 3 and 6 to 8 decreased markedly over time, indicating that the surface was becoming more hydrophilic while it remained in contact with water. The surface produced in Example 8 was less hydrophilic due to the high proportion of unmodified polysiloxane in the hydrophilic polymer network, but the contact angle still decreased over time.

EXAMPLES 9 TO 11

A SiH terminated polysiloxane polyoxyethylene block copolymer was prepared as described in Example 1 but replacing the polydimethylsiloxane fluid by a dimethylhydrogensilyl terminated polydimethylsiloxane fluid of average D.P. 19 and replacing the diallyl ether by 6.20 g of a polyethylene glycol diallyl ether of average D.P. 4.5 (SiH allyl ratio 3:1). The polysiloxane polyoxyethylene block copolymer produced had SiH content 2.37%.

In Examples 9 to 11, this polysiloxane polyoxyethylene block copolymer was cured by the vinyl-terminated Q-branched polysiloxanes of Examples 1 to 3 respectively. The amount of vinyl-terminated polysiloxane was such as to give a SiH to vinyl ratio of 1.2 (Examples 9 and 10) or 1.4 (Example 11). A water-insoluble hydrophilic polymer network was produced in each Example. Generally the cured compositions were somewhat harder than the corresponding cured composition of Examples 1 to 3.

EXAMPLES 12 TO 14

The SiH terminated polysiloxane polyoxyethylene block copolymer produced in Example 9 was mixed with a SiH terminated polydimethylsiloxane of substantially the same SiH content in weight ratio 50:50, 30:70 and 10:90. Each of these mixtures was mixed with 2% in weight of a platinum vinyl siloxane complex dissolved in a vinyl siloxane polymer at 0.5% platinum and the vinyl-terminated O-branched polysiloxane of Example 3 to give a SiH to vinyl ratio of 1.4:1. The resulting compositions were applied to a test surface and cured as described in Example 1. Water-insoluble hydrophilic polymer networks were produced.

The contact angle of water on each of the cured hydrophilic polymer networks of Examples 11 to 14 was measured over time as described above. The results are shown in Table 2. As can be seen from Table 2, the contact angle of water on the cured polymers of Examples 11 to 14 decreased over time, indicating that the surface was becoming more hydrophilic while it remained in contact with water.

TABLE 2

| Example | Contact angle after 30 sec | Contact angle after 60 sec | Contact angle after 120 sec | Contact angle after 180 sec |
|---|---|---|---|---|
| 11 | 83° | 72° | 69° | 67° |
| 12 | 81° | 80° | 75° | 73° |
| 13 | 89° | 84° | 82° | 79° |
| 14 | 85° | 80° | 74° | 72° |

EXAMPLE 15

15.43 g of a polyethylene glycol dimethallyl ether of average D.P. 6.7, 73.22 g dimethylhydrogensilyl terminated polydimethylsiloxane fluid of average D.P. 18 and 11.35 g of divinyl terminated polydimethylsiloxane fluid of average D.P. 54 were placed in 25 g toluene in a 3 necked flask and heated to 85° C. under nitrogen followed by addition of 0.1 g of a platinum vinyl siloxane complex catalyst. The weight ratio of oxyethylene groups to siloxane groups was 1:5. The mixture was heated for 1 hour at 85° C. then cooled to form a solution of a SiH terminated polysiloxane polyoxyethylene block copolymer with a SiH content of 0,545%. This block copolymer solution was mixed with 2% by weight of a platinum vinyl siloxane complex dissolved in a vinyl siloxane copolymer at 0.5% platinum and with a vinyl-terminated Q-branched polysiloxane as used in Example 1 to give a molar ratio of SiH groups of the SiH terminated polysiloxane polyoxyethylene block copolymer to vinyl groups of 1.4:1. The mixture was applied to a test plate surface and was left for 1 hour at ambient temperature. The composition cured to a water-insoluble hydrophilic polymer network.

The contact angle of water on the cured hydrophilic polymer network was measured over time as described above. The results are shown in Table 3. As can be seen from Table 3, the contact angle of water on the cured polymers of Examples 11 to 14 decreased over time, indicating that the surface was becoming more hydrophilic while it remained in contact with water.

TABLE 3

| Contact angle after 5 sec | Contact angle after 30 sec | Contact angle after 60 sec | Contact angle after 120 sec | Contact angle after 300 sec |
|---|---|---|---|---|
| 118.5° | 76° | 68° | 65° | 58° |

COMPARATIVE EXAMPLES 1 TO 7

A 3-necked flask was equipped with an addition funnel, temperature probe, condenser and an inert gas inlet. 28.1 g of a trimethylsiloxyterminated methylhydrogen siloxane polymer of Si—H content 1.50%, solvent (toluene) and a small amount of methyl capped allyl polyether of molecular weight 415 (D.P. of 6 oxyethelene (EO) units) were charged to the flask and heated to 50° C. under an inert atmosphere. The remaining polyether was added to the addition funnel. 2% by weight of a platinum vinyl siloxane complex dissolved in a vinyl siloxane copolymer at 0.5% platinum was added to the reaction flask followed by dropwise addition of the rest of the polyether. The total weight of polyether added was 18.0 g. The reaction mixture was left at 50° C. for 1 hour after complete addition of the polyether and was then refluxed until reaction was complete (all allyl groups consumed). The solvent was then removed by distillation and the product decanted. The rake copolymer product had a SiH content approximately half that of the starting material.

The block copolymer prepared above was mixed for 30 minutes with a linear vinyldimethylsilyl terminated polydimethylsiloxane containing 0.1 wt % methyl butynol inhibitor at a 2:1 SiH to vinyl ratio. A platinum vinyl siloxane complex dissolved in a vinyl siloxane copolymer at was added at 100 ppm platinum by weight. This was then left to sit whilst any air bubbles cleared. The mixture was poured into aluminium dishes and allowed to cure under ambient conditions. A hydrophilic polymer network was produced.

Comparative Example 1 was repeated using a linear hexenyldimethylsilyl terminated polydimethylsiloxane (Comparative Example 2) or the vinyl-terminated Q-branched polysiloxane (Comparative Example 3) in place of the linear vinyldimethylsilyl terminated polydimethylsiloxane, In each case a hydrophilic polymer network was produced. Comparative Example 3 was then repeated using the following allyl functional polyethers having oxyethelene groups in place of the one used there.

Comparative Example 4-allyl polyether-methyl capped MWt 1100

Comparative Example 5-allyl polyether-methyl capped $EO_n$ n=2-8

Comparative Example 6-allyl polyether-methyl capped $EO_n$ n=3-10

Comparative Example 7-allyl polyether-methyl capped $EO_n$ n=5-15

In each case a hydrophilic polymer network was produced.

The hydrophilic polymer networks of Example 1 and of Comparative Examples 1, 2, 3 and 7 were then exposed to marine conditions after having been coated on panels. Hydrophilic characteristics will provide good resistance to fouling by barnacles and weeds. All panels showed promising results for a period of 12 weeks, but after 41 weeks, the comparative examples had all exhibited unacceptable fouling levels. Example 1 still showed a good antifouling performance after 41 weeks of exposure. This indicates that the hydrophilic polymer networks according to the invention are surprisingly better than those of the prior art.

The invention claimed is:

1. A water-insoluble hydrophilic polymer network comprising polyorganosiloxane polyoxyalkylene block copolymer moieties of the form PS-(A-PO)$_m$-(A-PS)$_n$ or PS-(A-PO-A-PS)$_n$ wherein PS represents a polyorganosiloxane block with a degree of polymerization of 10 to 30, PO represents a polyoxyethylene block with a degree of polymerization of from 4 to 40 oxyethylene units, A represents a divalent radical and m and n have a value of at least 1, wherein the sum of the degree of polymerization of the polyorgansiloxane blocks and the degree of polymerization of the polyoxyethylene block in the block copolymer are each in the range 15 to 35, wherein at least three polysiloxane polyoxyalkylene block copolymer moieties are linked to each other through an organosilicon cross-linking moiety selected from a branched siloxane comprising one or more Q units of the formula (SiO$_{4/2}$), from 0 to 250 D units of the formula R$^b_2$SiO$_{2/2}$ and M units of the formula R$^a$R$^b_2$SiO$_{1/2}$, wherein the R$^a$ and R$^b$ substituents are selected from alkyl and alkenyl groups having 1 to 6 carbon atoms, at least three R$^a$ substituents in the branched siloxane being alkenyl units, provided that the cross-linking moiety forming the links between polyorganosiloxane polyoxyalkylene block copolymer moieties result from an addition reaction between silicon-bonded hydrogen atoms cross-linking sites present on the polyorganosiloxane polyoxyalkylene block copolymer and the alkenyl groups present on the branched siloxane prior to formation of the hydrophilic polymer network.

2. A water-insoluble hydrophilic polymer network according to claim 1 wherein the cross-linking sites of the polyorganosiloxane polyoxyalkylene block copolymer prior to formation of the network are situated on terminal silicon atoms of the terminal polyorganosiloxane blocks.

3. A water-insoluble hydrophilic polymer network according to claim 1 wherein each PS block is a polydimethylsiloxane block.

4. A water-insoluble hydrophilic polymer network according to claim 1 wherein each A group is independently selected from a divalent alkylene group and a divalent polyorganosiloxane group terminated by diorganosilylalkylene groups.

5. A water-insoluble hydrophilic polymer network according to claim 1 wherein it also contains a reinforcing filler.

6. A water-insoluble hydrophilic polymer network according to claim 1 wherein the surface becomes more hydrophilic upon wetting with water and reversibly becomes more hydrophobic on drying of the hydrophilic polymer network surface after being wetted with water, as shown by the contact angle of a water droplet on the surface of the hydrophilic polymer network decreasing with time after application of the water droplet to the surface and increasing upon drying.

* * * * *